(12) United States Patent
Nakamura et al.

(10) Patent No.: US 6,553,645 B2
(45) Date of Patent: Apr. 29, 2003

(54) HERMETIC MOTOR COMPRESSOR AND METHOD ASSEMBLING THE SAME

(75) Inventors: Hideshi Nakamura, Shiga (JP); Masahiro Tsubokawa, Shiga (JP); Satoshi Hakamada, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/879,135

(22) Filed: Jun. 13, 2001

(65) Prior Publication Data

US 2002/0047391 A1 Apr. 25, 2002

(30) Foreign Application Priority Data

Jun. 14, 2000 (JP) .......................... 2000-177953

(51) Int. Cl.[7] ................................. H02K 15/00
(52) U.S. Cl. .............. 29/596; 29/888.021; 29/888.022; 310/90
(58) Field of Search .................. 29/596, 598, 888.021, 29/888.022, 447, 407.5; 310/90

(56) References Cited

U.S. PATENT DOCUMENTS

| 5,411,384 A | * | 5/1995 | Bass et al. ................. 418/55.1 |
| 5,678,299 A | * | 10/1997 | Mochizuki et al. ........... 29/596 |
| 5,701,668 A | * | 12/1997 | Dreiman et al. ......... 29/888.02 |
| 5,807,070 A | * | 9/1998 | Bock ........................... 415/132 |
| 6,407,475 B1 | * | 6/2002 | Care ........................... 310/90.5 |

FOREIGN PATENT DOCUMENTS

JP 7-127580 5/1995

* cited by examiner

Primary Examiner—Gregory M. Vidovich
Assistant Examiner—Stephen Kenny
(74) Attorney, Agent, or Firm—Wenderoth, Lind & Ponack, L.L.P.

(57) ABSTRACT

A motor stator is fixed to a body shell by shrinkage fit with a large fitting margin, and a compression mechanism is then shrinkage fit with a small fitting margin, and welded thereafter. Afterwards, an auxiliary bearing assembly is fixed in position with reference to the compression mechanism by shrinkage fit with a small fitting margin, followed further by welding.

5 Claims, 5 Drawing Sheets

FIG. 1

Three-point spot welding ⇒

Three-point spot welding ⇒

HERMETIC MOTOR COMPRESSOR AND METHOD ASSEMBLING THE SAME

BACKGROUND OF THE INVENTION

1. Field of the Invention

The present invention relates to a hermetic motor compressor for use in an air-conditioning appliance, refrigeration equipment, and the like, and relates further to a method of assembling the same.

2. Description of the Related Art

A hermetic motor compressor of the prior art and a method of assembling it will be described hereinafter with reference to FIG. 5.

Figure 5:
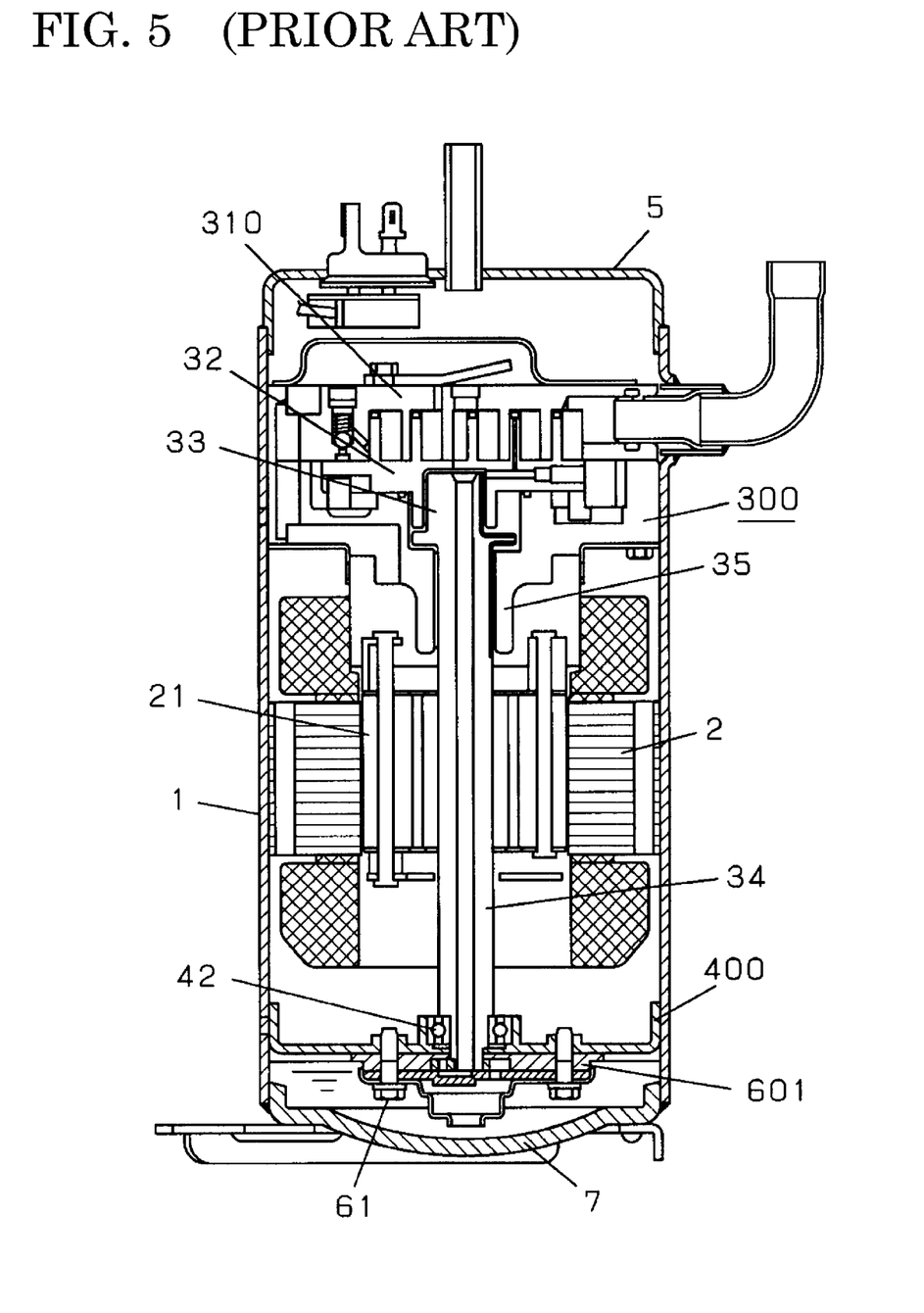
FIG. 5 is a drawing depicting a hermetic motor compressor of the prior art.

In FIG. 5, a body shell 1, an upper shell 5, and a bottom shell 7 constitute a hermetically sealed enclosure. A compression mechanism 300 is disposed in an upper part of the hermetically sealed enclosure. A main shaft 34 constructed at an end of a crankshaft 33, which rotary drives a orbiting scroll member 32, is journally supported by a main bearing 35, as it extends downward. A motor rotor 21 is fixed firmly to the main shaft 34. A motor stator 2 is fixed to the body shell 1 in a manner to confront an outer periphery of the motor rotor 21. A bearing bracket 400 retaining an auxiliary bearing 42 is secured to the body shell 1 in a lower part of the hermetically sealed enclosure, for journally supporting a distal end of the main shaft. In addition, a lubricant pump mechanism 601 is arranged under the bearing bracket 400. The pump mechanism 601 supplies lubricant collected in a bottom space of the hermetically sealed enclosure to the compression mechanism through a lubricant passage provided in an inside of the main shaft 34.

A method of assembling the above-said hermetic motor compressor of the prior art will now be described hereafter.

First, the body shell 1 is heated to expand thermally, and shrinkage fit the motor stator 2 in it. Next, the bearing bracket 400 is positioned to be in parallel with the motor stator, and three-point spot welding is made with its peripheral rim held in contact to the body shell 1. Then, the compression mechanism 300 is inserted so that the distal end of the main shaft is journally supported by the bearing bracket 400 via the auxiliary bearing 42. There is arranged in this connection that a gap of approximately 0.25 mm is provided between an outer diameter of the compression mechanism 300 and an inner diameter of the body shell 1, so as to absorb a play in the bearing. Next, the compression mechanism 300 and the body shell 1 are fixed by three-point spot welding, after the compression mechanism 300 is adjusted within a margin of this gap so that a center of it is in alignment with a center of the auxiliary bearing 42. The reason for providing the gap between the compression mechanism and the body shell for absorbing the play in the bearing is that a satisfactory mechanical strength is not otherwise obtainable when two plate-like metals such as the auxiliary bearing bracket and the body shell are spot-welded together while a gap remained existent between them.

However, the above structure and the assembling method of the prior art have such problems as stated hereinafter.

(1) The compression mechanism shifts in a direction toward a point that begins to melt first among the three points when the three-point spot welding is being made on the compression mechanism.

(2) The bearing bracket deforms, although only slightly, when it is used as a positioning reference since it is fabricated normally by sheet metal stamping. This makes it difficult to carry out the positioning accurately.

(3) The compression mechanism shifts in its position due to a stress it receives when the upper shell is press-fit, since the compression mechanism is fixed to the body shell only by the spot welding at three points.

If the individual components are assembled improperly in their positions with respect to each other as described above, the hermetic motor compressor causes excess vibration, bearing losses, and wear in the sliding parts. Consequently, they bring rise to problems affecting the quietness, efficiency, reliability, and so forth.

SUMMARY OF THE INVENTION

The present invention is devised in consideration of the above problems of the prior art. A hermetic motor compressor of this invention comprises:

(1) a main shaft constructed at one end of a crankshaft for rotatory driving a orbiting scroll member which is in engagement with a stationary scroll member to form a plurality of compression spaces;

(2) a compression mechanism having a main bearing supporting the main shaft in a freely rotatable manner;

(3) a motor comprising a rotor fixed to the main shaft, and a stator having a stator winding wound on an iron core with an electrical insulator;

(4) an auxiliary bearing journally supporting a distal end of the main shaft;

(5) a bearing holder retaining the auxiliary bearing;

(6) a bearing bracket mounting the bearing holder in any of a slidable manner and a stationary manner;

(7) an auxiliary bearing assembly positioned at one side of the motor opposite the compression mechanism;

(8) a cylindrically-formed body shell which retains and encloses the compression mechanism, the motor and the auxiliary bearing assembly, and that the stator of the motor is fixed into the body shell by shrinkage fit, and the compression mechanism is welded after it is shrinkage-fit into the body shell.

Further, a method of assembling the hermetic motor compressor of this invention comprises:

(1) a first step for shrinkage-fitting the stator of the motor into the body shell;

(2) a second step for shrinkage-fitting the compression mechanism to the body shell followed thereafter by welding;

(3) a third step for fixing the bearing bracket integrally to the body shell; and (4) a fourth step for shifting the bearing holder and the bearing bracket slidingly in a radial direction while turning the main shaft with an external force and measuring a turning torque of it, and for fixing the bearing holder to the bearing bracket at a position where the rotating torque becomes smallest.

DESCRIPTION OF THE PREFERRED EMBODIMENT

An exemplary embodiment of the present invention will be described hereinafter with reference to the accompanying figures.

(First Exemplary Embodiment)

Figure 1:
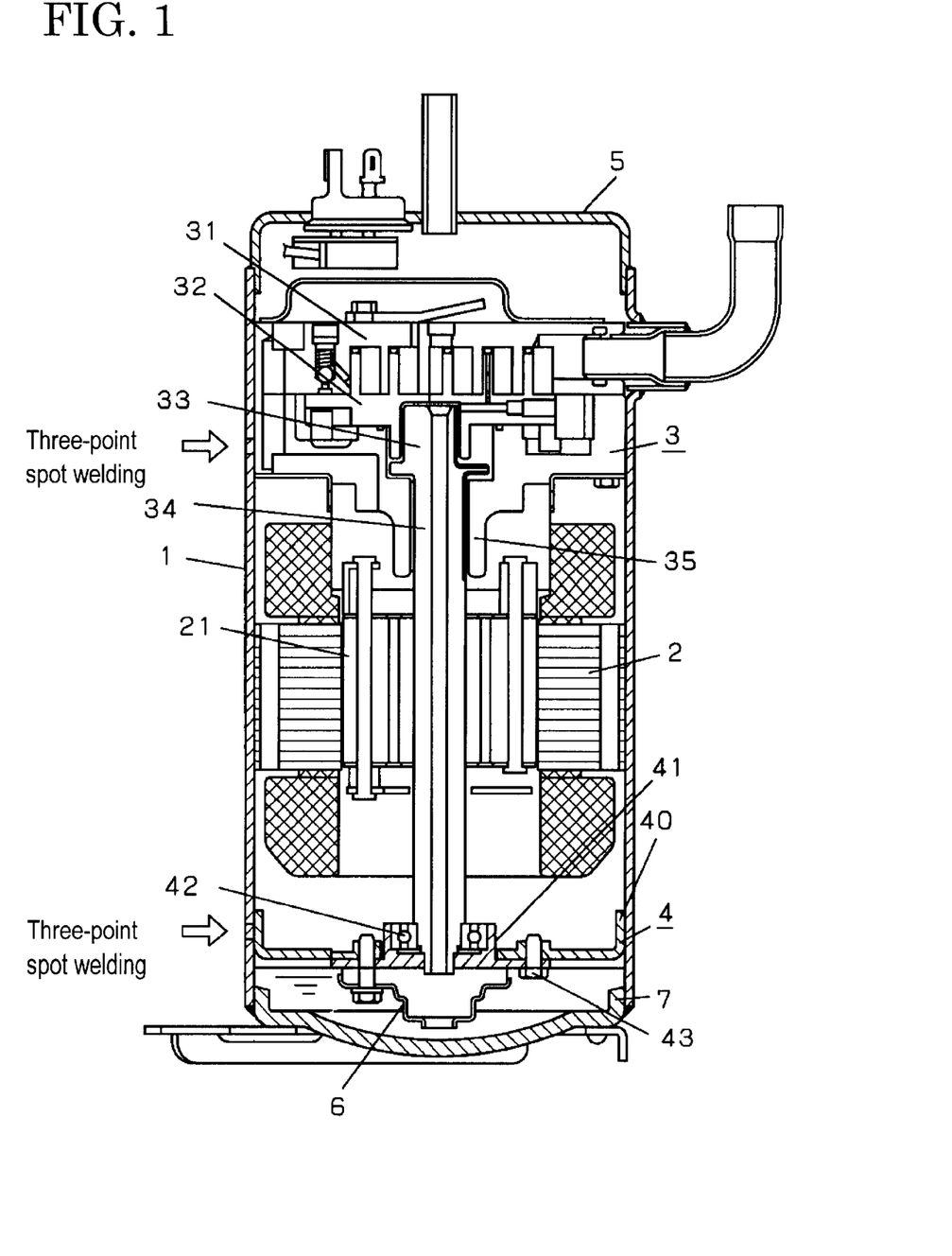
FIG. 1 is a sectional view depicting a hermetic motor compressor of an exemplary embodiment of the present invention.
Figure 2:
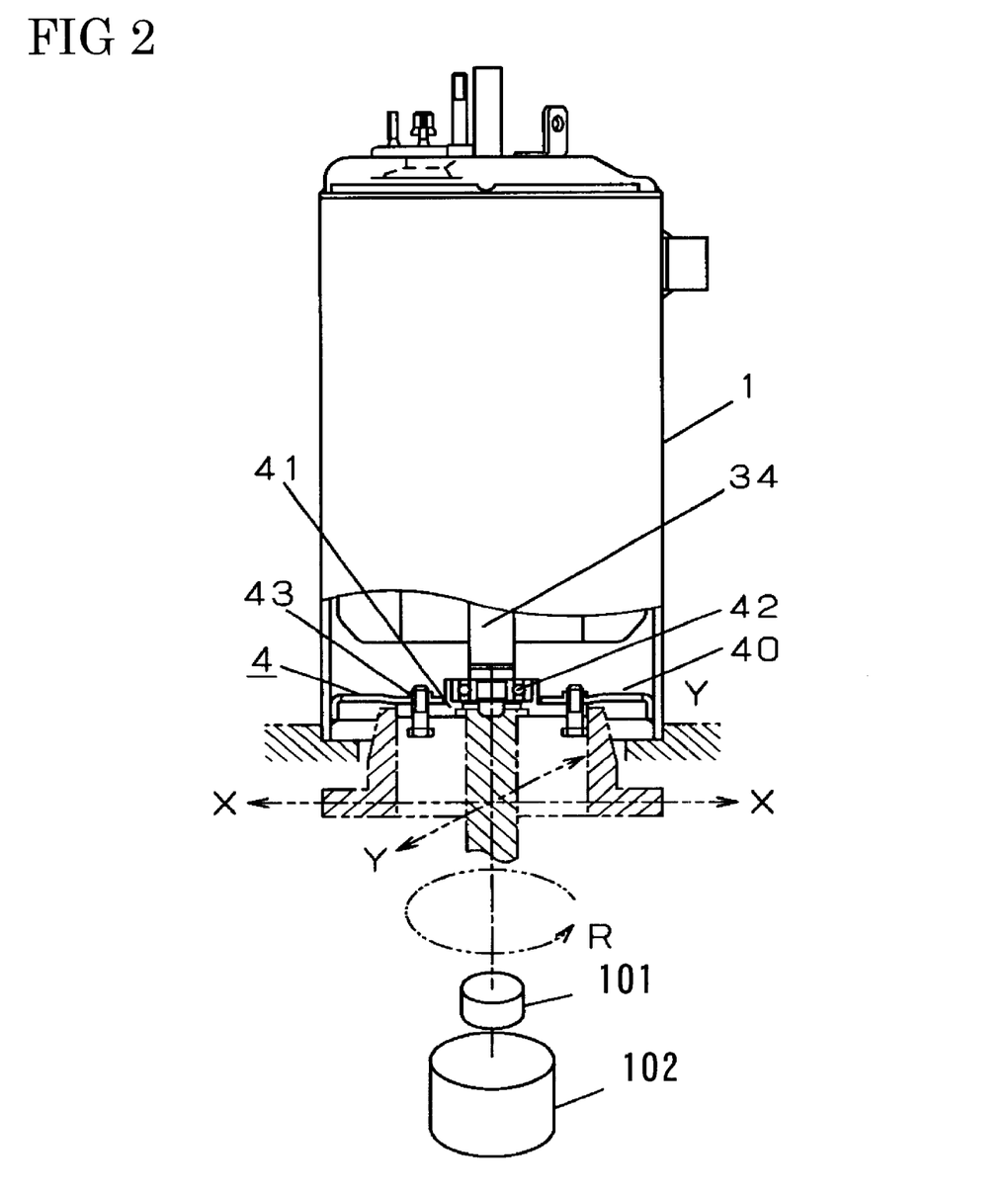
FIG. 2 is a schematic drawing illustrating a method of adjusting a position of an auxiliary bearing in an exemplary embodiment of this invention.
Figure 3:
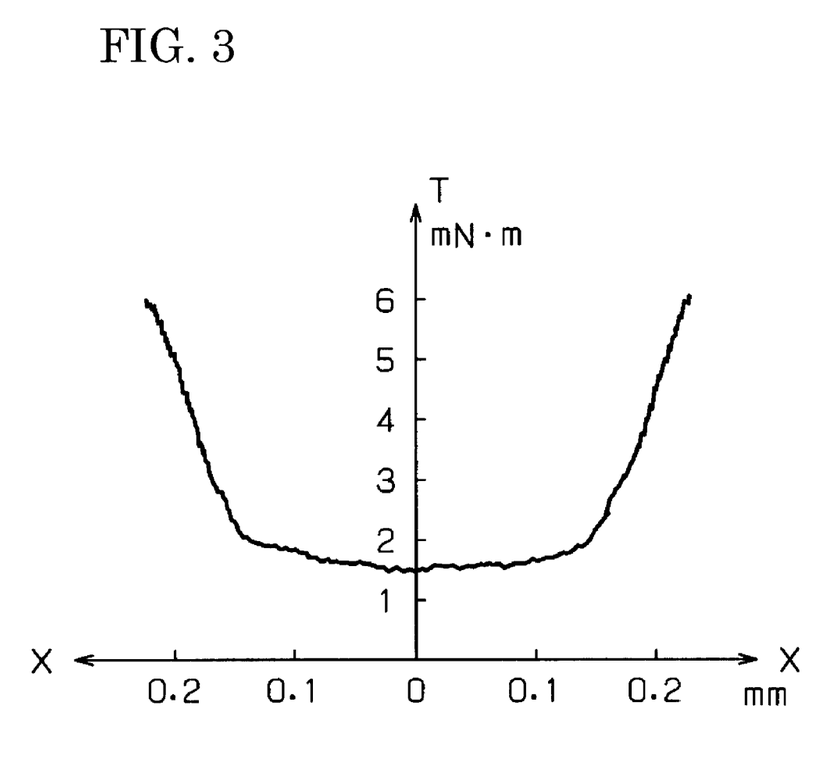
FIG. 3 is a graphical representation showing a relation between position of the auxiliary bearing and turning torque of the bearing in an adjustment of the bearing position.

FIG. 1 is a sectional view of a hermetic motor compressor of an exemplary embodiment of this invention, and FIG. 2 is a schematic drawing illustrating a method of adjusting a position of an auxiliary bearing in the exemplary embodiment of this invention. In addition, FIG. 3 is a graphical representation showing a relation between position of the auxiliary bearing and turning torque of the bearing in an adjustment of the bearing position.

In FIG. 1, a body shell 1 is constructed of a cylindrically-formed metal. A motor stator 2 comprises a stator winding wound via an electrical insulator on a stator core composed of laminated sheets of magnetic steel. A motor rotor 21 rotates as it generates a rotational force through a rotating magnetic field produced by the stator 2. A compression mechanism 3 comprises (1) a stationary scroll member 31 provided with a stationary scroll vane formed on a stationary frame, (2) a orbiting scroll member 32 provided with a rotary scroll vane formed on a mirror finished surface in engagement with the stationary scroll vane, forming a plurality of compression spaces, (3) a crankshaft 33 for rotatory driving the orbiting scroll member 32, (4) a main shaft 34 constructed at one end of the crankshaft 33, and projecting toward the orbiting scroll member 32, and (5) a main bearing 35 supporting the main shaft 34 in a freely rotatable manner. An auxiliary bearing assembly 4 comprises (1) an auxiliary bearing 42 journally supporting a distal end of the main shaft 34, (2) a bearing holder 41 retaining the auxiliary bearing 42, (3) a bearing bracket 40 mounting the bearing holder 41 in any of a slidable manner and a stationary manner, as selectable with a bearing fixation screw 43. The bearing bracket 40 has a surface along its outer periphery to come in close contact to an inner surface of the body shell. A pump mechanism 6 draws up lubricant collected in a bottom space of the hermetically sealed enclosure by a trochoid pump, and supplies it to the compression mechanism.

A method of assembling the hermetic motor compressor of the above structure will now be described hereafter in the order of processing.

First Step: The body shell 1 is heated to expand thermally, and the motor stator 2 is inserted into a predetermined position. The motor stator 2 is fixed by shrinkage fit in the body shell 1 by cooling the body shell 1 down to the normal temperature.

In this process, the body shell 1 can be heated at a high temperature because it is unlikely to raise a problem even if the body shell 1 is exposed to the high temperature as compared to the motor stator. Since this can result in a large thermal expansion, it facilitates the shrinkage fit even with a large fitting margin (i.e. an amount by which an outer radius of the motor stator 2 exceeds an inner radius of the body shell 1).

Second Step: The body shell 1 in which the motor stator 2 is fixed in the first step is heated again. The compression mechanism 3, prefabricated separately in a clean room and provided with the motor rotor 21 and the auxiliary bearing 42 press-fit on its main shaft 34, is then inserted into a predetermined position. The compression mechanism 3 is then fixed by shrinkage fit as the body shell 1 provided with the motor stator 2 is cooled thereafter to the normal temperature. In this step, the body shell 1 is heated at a comparatively low temperature because it is provided with the motor stator 2 containing an insulating material that sets a limit to the heating temperature. Because this makes it difficult for the body shell 1 to exhibit a good extent of thermal expansion, there is only a small fitting margin (i.e. an amount by which an outer radius of the compression mechanism 3 exceeds the inner radius of the body shell 1) provided for the shrinkage fit. For this reason, the body shell 1 and the compression mechanism 3 are spot-welded to reinforce the mechanical strength.

Third Step: Following the second step, the body shell 1 provided with the motor stator 2 and the compression mechanism 3 is heated for the third time. The auxiliary bearing 42 is then positioned in its predetermined place with reference to the compression mechanism 3, and the body shell 1 is cooled to the normal temperature to fix the bearing bracket 40 by shrinkage fit. In this state, the auxiliary bearing 42 is fit into the bearing holder 41, which is mounted in a slidable manner along a radial direction on the bearing bracket 40 with the bearing fixation screw 43. Further, there is provided a small fitting margin (i.e. an amount by which an outer radius of the bearing bracket 40 exceeds the inner radius of the body shell 1) for the shrinkage fit, and the mechanical strength is reinforced with spot welding in the like manner as the second step, because of a limitation in the heating temperature.

Fourth Step: After an upper shell is press-fit and welded to the body shell, the main shaft 34 coupled via a torque sensor 101 to an external motor 102 is turned slowly, as shown in FIG. 2. While the main shaft is kept turning, the bearing holder 41 is moved in a direction shown by X—X with respect to the main body.

In this case, a torque of the bearing detected by the torque sensor 101 in relation to a position in the X—X direction shows such a characteristic that it becomes smallest at an optimum position, and it increases sharply when the position is shifted by a certain extent, as shown in FIG. 3. A position of the auxiliary bearing 42 in the X—X direction is elected in this manner by locating it where the torque of the bearing becomes smallest, while turning the main shaft 34 and sliding the bearing holder along the X—X direction at the same time. Next, a position of the bearing holder 41 along an Y—Y direction is also elected in the same manner by locating it where the torque of the bearing becomes smallest. Afterwards, the bearing holder 41 is fixed to the bearing bracket 40 by tightening the bearing fixation screw 43.

Finally, an assembly of the hermetic motor compressor is completed when a lower shell 7 is welded after it is press-fit to the body shell 1.

Consequently, this allows the assembly of components built into the hermetically sealed enclosure with high accuracy, thereby providing the highly efficient and highly reliable hermetic motor compressor.

(Second Exemplary Embodiment)

Figure 4A:
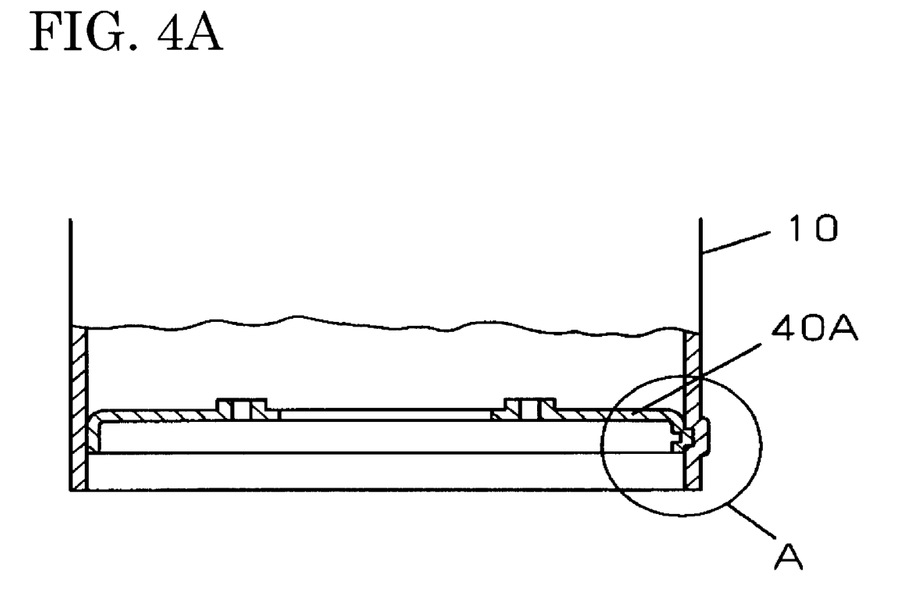
FIG. 4A is a partially sectioned view of a hermetic motor compressor of another exemplary embodiment of this invention.
Figure 4B:
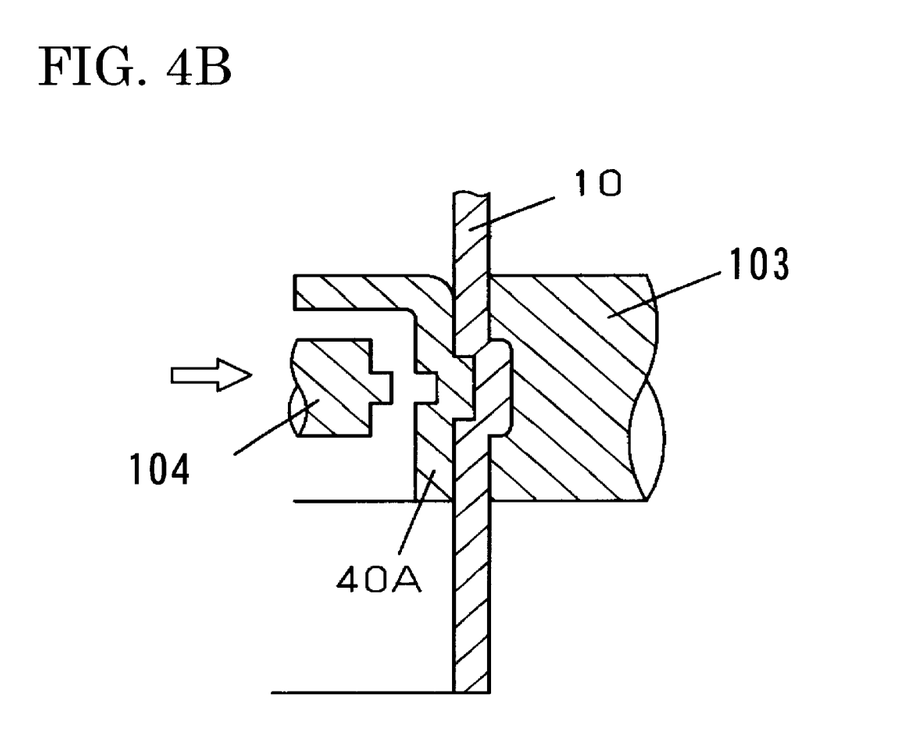
FIG. 4B is an enlarged sectional view illustrating a part marked with a letter A in FIG. 4A.

FIG. 4A is a partially sectioned view depicting a hermetic motor compressor of another exemplary embodiment of this invention. Also, FIG. 4 B is an enlarged sectional view of a part of FIG. 4A, as marked with a letter A, which illustrates a method of joining and fixing a bearing bracket and a body shell. In FIGS. 4A and 4B, the body shell 10 is constructed of cylindrically shaped metal. The bearing bracket 40A for an auxiliary bearing is fabricated by sheet metal stamping, with which a peripheral rim is bent into an axial direction to form a surface that comes in contact closely to an inner surface of the body shell.

The bearing bracket 40A is positioned in a predetermined place in the body shell. While it is held in the position, a die block (female section) 103 is held in contact against the outer peripheral side of the body shell 10, and a punch block (male section) 104 is pressed with an intense force from the inner peripheral side of the bearing bracket, as shown in FIG. 4 B. This causes the body shell 10 and the bearing bracket 40A to deform plastically, thereby joining the bearing bracket and the body shell mechanical firmly.

With the use of plastic deformation as means to join the body shell and the bearing bracket, as described above, the bearing bracket and the body shell can be fixed together securely without producing welding spatter and metal filings. It can thus avoid welding spatter and metal filings from getting into the bearing components to become cause of a quality defect, thereby achieving the hermetic motor compressor of high quality.

Furthermore, the fitting margins for the shrinkage fit of the compression mechanism and the bearing bracket are arranged to be smaller as compared with the fitting margin of the motor stator. This provides an advantageous effect of avoiding the insulation material of the motor stator, the auxiliary bearing attached to the distal end of the main shaft, and so on from being subjected to an intense thermal stress, and allowing the shrinkage fittings easily.

What is claimed is:

1. A method of assembling hermetic motor compressor having:
    a main shaft constructed at one end of a crankshaft for rotatory driving a orbiting scroll member in engagement with a stationary scroll member, said orbiting scroll member forming a plurality of compression spaces;
    a compression mechanism having a main bearing supporting said main shaft in a freely rotatable manner;
    a motor comprising a rotor fixed to said main shaft, and a stator having a stator winding wound on an iron core with an electrical insulator;
    an auxiliary bearing supporting a distal end of said main shaft;
    a bearing holder retaining said auxiliary bearing;
    a bearing bracket mounting said bearing holder in any of a slidable manner and a stationary manner;
    an auxiliary bearing assembly positioned at one side of said motor opposite to said compression mechanism; and
    a cylindrically-formed body shell retaining and enclosing said compression mechanism, said motor and said auxiliary bearing assembly,
    said method comprising:
    a first step for shrinkage-fitting said stator into said body shell;
    a second step for shrinkage-fitting, and welding thereafter to fix said compression mechanism to said body shell;
    a third step for fixing said bearing bracket integrally to said body shell; and
    a fourth step for shifting said bearing holder and said bearing bracket in a radial direction while turning said main shaft with an external force and measuring a turning torque thereof, and for fixing said bearing holder to said bearing bracket at a position where the rotating torque becomes smallest.

2. The method of assembling hermetic motor compressor as set forth in claim 1, wherein said third step comprises the steps of (a) shrinkage-fitting said bearing bracket into said body shell, and (b) welding said bearing bracket to said body shell after step (a).

3. The method of assembling hermetic motor compressor as set forth in claim 1, wherein said third step comprises the steps of forming a surface to be in contact closely with an inner surface of said body shell, by bending a peripheral rim of said bearing bracket into an axial direction, and deforming plastically a portion of said surface in contact with said body shell toward a radial direction together with said body shell.

4. The method of assembling hermetic motor compressor as set forth in claim 1, wherein a fitting margin for the shrinkage fit of said motor stator to said body shell is larger than any of fitting margins for the shrinkage fit of said bearing bracket and said compression mechanism to said body shell.

5. The method of assembling hermetic motor compressor as set forth in claim 2, wherein a fitting margin for the shrinkage fit of said motor stator to said body shell is larger than any of fitting margins for the shrinkage fit of said bearing bracket and said compression mechanism to said body shell.

\* \* \* \* \*

UNITED STATES PATENT AND TRADEMARK OFFICE
CERTIFICATE OF CORRECTION

PATENT NO.     : 6,553,645 B2
DATED          : April 29, 2003
INVENTOR(S)    : Hideshi Nakamura et al.

It is certified that error appears in the above-identified patent and that said Letters Patent is hereby corrected as shown below:

Column 1,
Line 19, change "rotatory drives a orbiting" to -- rotatively drives an orbiting --;
Line 36, after "shrinkage fit" insert -- to --;
Line 36, change "2 in it." to -- 2 disposed therein. --;
Line 38, change "made with" to -- performed with --;
Line 46, change "a play" to -- play --;
Line 61, change "being made" to -- perfomed --;

Column 2,
Line 9, change "bring" to -- give --;
Line 17, change "rotatory driving a orbiting" to -- rotatively driving an orbiting --;

Column 3,
Line 29, change "a orbiting" to -- an orbiting --;
Line 32, change "rotatory" to -- rotatively --;
Line 39, after "42," insert -- and --;

Column 4,
Line 41, change "that it" to -- that the torque --;
Line 49, change "an Y-Y" to -- a Y-Y --;
Line 63, change "4 B" to -- 4B --;

Column 5,
Line 12, change "4 B" to -- 4B --;
Line 13, after "thereby" insert -- mechanically --;
Line 14, delete "mechanical";

UNITED STATES PATENT AND TRADEMARK OFFICE
CERTIFICATE OF CORRECTION

PATENT NO. : 6,553,645 B2
DATED : April 29, 2003
INVENTOR(S) : Hideshi Nakamura et al.

It is certified that error appears in the above-identified patent and that said Letters Patent is hereby corrected as shown below:

<u>Column 5 cont'd,</u>
Line 19, change "avoid" to -- prevent --;
Line 20, after "become" insert -- the --
Line 32, after "assembling" insert -- a --;
Line 35, change "rotatory driving a orbiting" to -- rotatively driving an orbiting --;

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,553,645 B2
DATED : April 29, 2003
INVENTOR(S) : Hideshi Nakamura et al.

It is certified that error appears in the above-identified patent and that said Letters Patent is hereby corrected as shown below:

<u>Title page, Item [54] and Column 1, Lines 1 and 2,</u>
Title, change "HERMETIC MOTOR COMPRESSOR AND METHOD ASSEMBLING THE SAME." to -- HERMETIC MOTOR COMPRESSOR AND METHOD OF ASSEMBLING THE SAME. --.

Signed and Sealed this

Ninth Day of March, 2004

JON W. DUDAS
*Acting Director of the United States Patent and Trademark Office*